(12) United States Patent
Prabandham et al.

(10) Patent No.: US 6,668,327 B1
(45) Date of Patent: Dec. 23, 2003

(54) DISTRIBUTED AUTHENTICATION MECHANISMS FOR HANDLING DIVERSE AUTHENTICATION SYSTEMS IN AN ENTERPRISE COMPUTER SYSTEM

(75) Inventors: Harish Prabandham, Sunnyvale, CA (US); Vivek Nagar, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/332,775

(22) Filed: Jun. 14, 1999

(51) Int. Cl.⁷ .................................................. G06F 1/24
(52) U.S. Cl. ...................... 713/201; 713/200; 713/155; 713/162; 713/168
(58) Field of Search ................................ 713/201, 155, 713/162, 168, 182, 200

(56) References Cited

U.S. PATENT DOCUMENTS

| | | |
|---|---|---|
| 4,190,832 A | 2/1980 | Mohler |
| 4,198,655 A | 4/1980 | Coulomb |
| 4,716,458 A | 12/1987 | Heitzman et al. |
| 4,814,896 A | 3/1989 | Heitzman et al. |
| 5,051,735 A | 9/1991 | Furukawa |
| 5,119,189 A | 6/1992 | Iwamoto et al. |
| 5,309,137 A | 5/1994 | Kajiwara |
| 5,369,590 A | 11/1994 | Karasudani |
| 5,386,285 A | 1/1995 | Asayama |
| 5,392,140 A | 2/1995 | Ezra et al. |
| 5,424,952 A | 6/1995 | Asayama |
| 5,473,364 A | 12/1995 | Burt |
| 5,560,008 A * | 9/1996 | Johnson et al. .............. 713/201 |
| 5,604,490 A * | 2/1997 | Blakley et al. .............. 713/200 |
| 5,638,202 A | 6/1997 | Rofe |
| 5,661,518 A | 8/1997 | Palm et al. |
| 5,731,853 A | 3/1998 | Taketomi et al. |
| 5,793,308 A | 8/1998 | Rosinski et al. |
| 5,818,959 A | 10/1998 | Webb et al. |
| 5,831,765 A | 11/1998 | Nakayama et al. |
| 5,864,375 A | 1/1999 | Taketomi et al. |

* cited by examiner

Primary Examiner—Thomas R. Peeso
(74) Attorney, Agent, or Firm—Beyer Weaver & Thomas LLP

(57) ABSTRACT

Methods and computer systems for providing access to a protected resource are described. In an enterprise computer system, an authentication server provides a client requesting access to the protected resource a credential. In order to access the protected resource, the requesting client presents a protected resource access request in combination with the credential to a server coupled to the protected resource. The server, in turn, requests the authentication server to validate the credential. After the authentication server has validated the credential, the server grants the requesting client access to the protected resource.

24 Claims, 10 Drawing Sheets

DISTRIBUTED AUTHENTICATION MECHANISMS FOR HANDLING DIVERSE AUTHENTICATION SYSTEMS IN AN ENTERPRISE COMPUTER SYSTEM

BACKGROUND OF THE INVENTION

1. Field of Invention

The invention relates generally to computer systems. More particularly, methods and apparatus for providing distributed authentication in an enterprise computer system.

2. Description of Relevant Art

In modem enterprise computing environments, a number of personal computers, workstations, mainframes, and the like along with other devices such as large mass storage subsystems, network interfaces, as well as interfaces to the public telephony systems are interconnected providing an integrated environment in which information may be shared among the various users. Typically, users may be performing a variety of operations, including order receipt, manufacturing, shipping, billing, inventory control, and other operations in which sharing of data on a real time basis provides a significant advantage over, for example, maintaining separate records and attempting to reconcile them later.

One problem that arises in an enterprise computing environment is that often the various users are using programs which have been developed based on a data or programming model that assumes that the data they receive, process, and store will be unique to that particular program. One solution to this problem is to force all types of programs to be constrained to the same type data or programming model. However, there are several problems with this strategy, one of which is for example that while constraining the enterprise computer system to a single platform may be efficient for some types of programs it can be very inefficient for other types of programs.

Another strategy used to overcome the problem of cross platform communication is to provide an information exchange engine that can translate data between platforms. While this will allow each program to have its own data or programming model, it requires acquiring and maintaining exchange engines for a number of programs and a user to select an appropriate exchange engine when importing or exporting information form another program. In addition, as the number of users and/or exchange engines increases in order to meet the needs of an expanding system, the interconnections between each of the components becomes prohibitively complex forming a "spaghetti like mass". This increase in complexity effectively limits the scalability of an integrated set of computer resources since any additional computer resources require reconfiguring the entire system.

As an example, FIG. 1 is an illustration of a conventional enterprise computing system 100. The enterprise computing system 100 includes exchange engines 102–110 capable of accessing and cross connection of any number and type of information sources 112 and 114. Such sources include various database management systems, applications programs, large mass storage subsystems, network interfaces, as well as interfaces to the public telephony systems such as to the Internet. The database management applications generally include computer programs that are executed in conventional manner by digital computer systems over any number of computing platforms. Typically, the exchange engines include computer programs executed by digital computer systems (which may be the same digital computer systems on which their respective applications programs are executed). The exchange engines and the application programs are processed and maintained on a number of digital computer systems interconnected by, for example, a network 116 which transfers data access requests, translated data access requests and responses between the computer systems on which the exchange engines and application programs are processed. As can be seen, as the enterprise computer system expands, the number of application programs and associated digital computer systems increase to meet the needs of the expanded enterprise computer system. The scalability of this type enterprise computer system is poor since any substantial increase in the number of digital computers greatly increases the complexity of the network 116 which in turn greatly increases the resources required to maintain and upgrade the system 100.

One approach to solving the problems of cross platform communication and scalability is to use component based, multi-tier applications based on, for example, Enterprise JavaBeans (EJB) technology from Sun Microsystems Inc. of Mountain View, Calif. Enterprise JavaBeans technology, in the form of an EJB server, represents a multi-tier design that simplifies developing, deploying, and maintaining enterprise applications. It enables developers to focus on the specifics of programming their business logic, relying on the EJB server to provide system services, and client-side applications (both stand alone and within web browsers) to provide the user interaction. Once developed, business logic can be deployed on servers appropriate to existing needs of an organization.

Although EJB server technology substantially improves scalability and many of the problems related to cross platform performance, there still remains the need to provide some form of cross platform security since a number of the computer systems within the enterprise computer system have their own authentication protocols and methods.

Therefore, in view of the foregoing, it would be advantageous and therefore desirable to have a scalable, cross platform enterprise computer system having the capability of providing transparent multi-platform security.

SUMMARY OF THE INVENTION

The invention can be implemented in numerous ways, including as a method, an apparatus, and a computer system Several embodiments of the invention are discussed below.

In one embodiment of the invention, a distributed object computing system having an authentication server is described. The authentication server provides a credential that grants a credential owner permission to access a protected resource in the computing system. The protected resource is identified in authentication data included in an associated credential request that is provided by a requesting client. The authentication server includes a credential request verifier that determines if additional authentication data is required by the authentication server in order to grant the credential to the requesting client. A realm authenticator coupled to the credential request verifier that authenticates the requesting client in a requested realm when it is determined that the requesting client is allowed to access the requested realm. A credential translator coupled to the realm authenticator that grants a requested privilege in the authenticated realm to the requesting client when it is determined that the requesting client is allowed the requested privilege in the authenticated realm. A credential generator coupled to the credential translator arranged to provide the credential to the requesting client.

In another embodiment of the invention, a method for accessing a protected resource coupled to a server in an enterprise computer system is described. A requesting client provides a protected resource access request to an authentication server. The authentication server uses authentication data provided in the authentication request to provide the requesting client a reference to a credential. The requesting client, in turn, provides the reference to the credential in conjunction with a protected resource access request to the server coupled to the protected resource. The server requests that the authentication server validates by credential after which the server grants the requesting client access to the protected resource.

In a preferred embodiment, the server is an Enterprise Java Bean (EJB) server.

These and other advantages of the present invention will become apparent upon reading the following detailed descriptions and studying the various figures of the drawings.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE EMBODIMENTS

In the following description, frameworks and methods of providing for secure transactions in a multi-platform enterprise computer as described. Although, the invention will initially be described in terms of an authentication server residing in an Enterprise Java Bean (EJB) based enterprise computer system, the present invention can be used in any networked computer system including those that include multi-threaded object oriented computer systems.

In general, in an EJB based enterprise computer system having a number of interconnected EJB servers, when a requesting client application, such as, for example, an applet in a browser, desires to access a secure, or protected, data base or other resource, the requesting client application first locates an authentication server. In one embodiment, the requesting client locates an authentication server by first accessing a name server that in response to a client request provides an address for the authentication server. The requesting client then requests a credential from the authentication server. In one implementation, the credential provides the requesting client with the ability to access a protected resource, such as an external database. In order to obtain the credential, however, the requesting client must first provide the authentication server with information that includes which realm, or realms, the client desires to be authenticated. By realms, it is meant the user/name/auth date database contained on platforms, such as UNIX, Windows NT, etc. on which the object that the client desires to access executes. By way of example, if the client wishes to access a secure data base running in a UNIX platform, it must first request that the authentication server authenticate the requesting client in the UNIX platform on behalf of the requesting client.

Once the authentication server has authenticated the client in the appropriate realm(s), the authentication server then translates the privileges granted by the realm into the credential and returns a remote reference to the credential to the client. The client can then use the remote reference to the credential for subsequent access requests, such as for objects or protected resources such as data bases. By providing a remote reference to the credential, therefore, the invention is suitably disposed to run in any number and type of multi-threaded computer systems.

Figure 1:
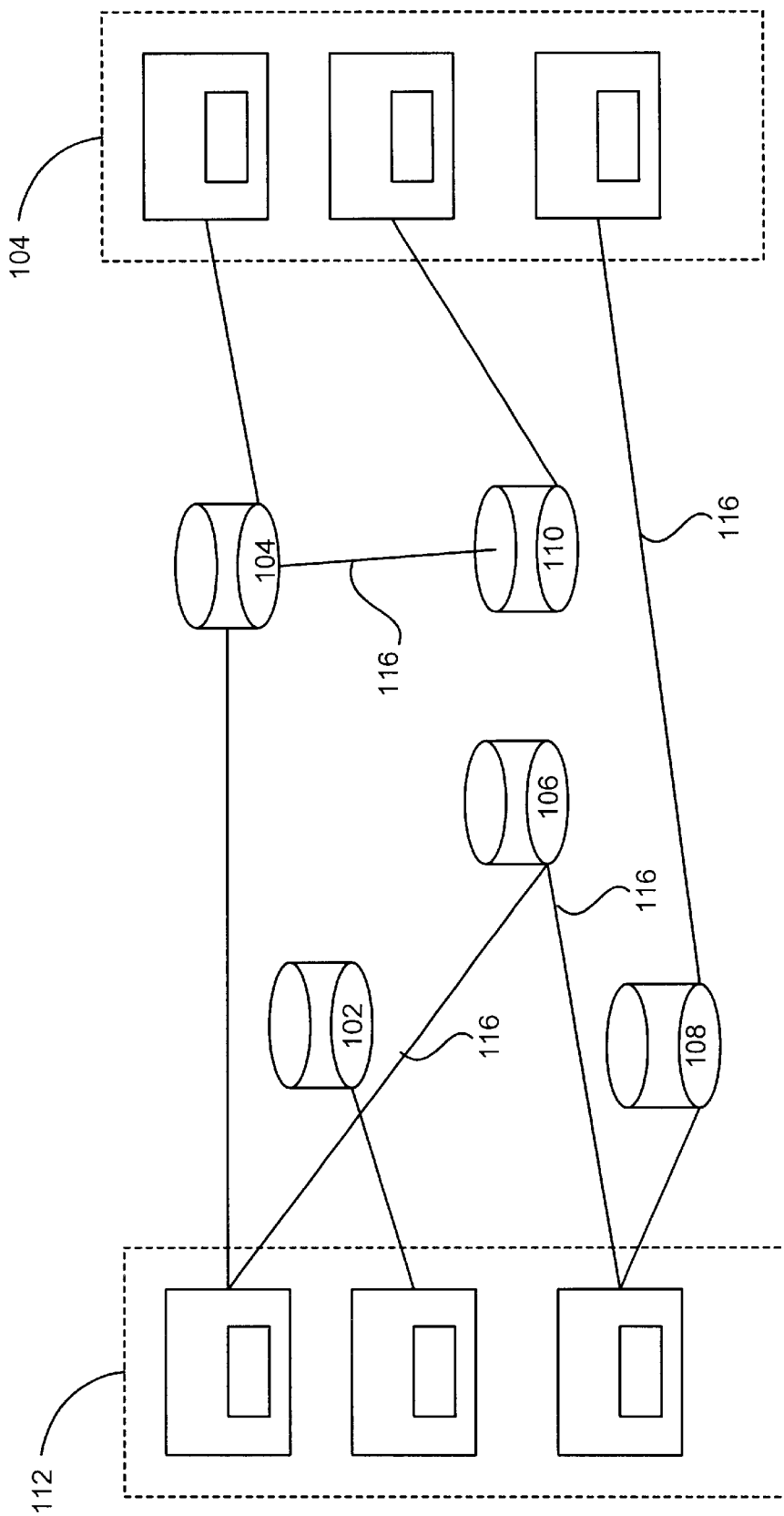
FIG. 1 shows a conventional enterprise computer system.
Figure 2:
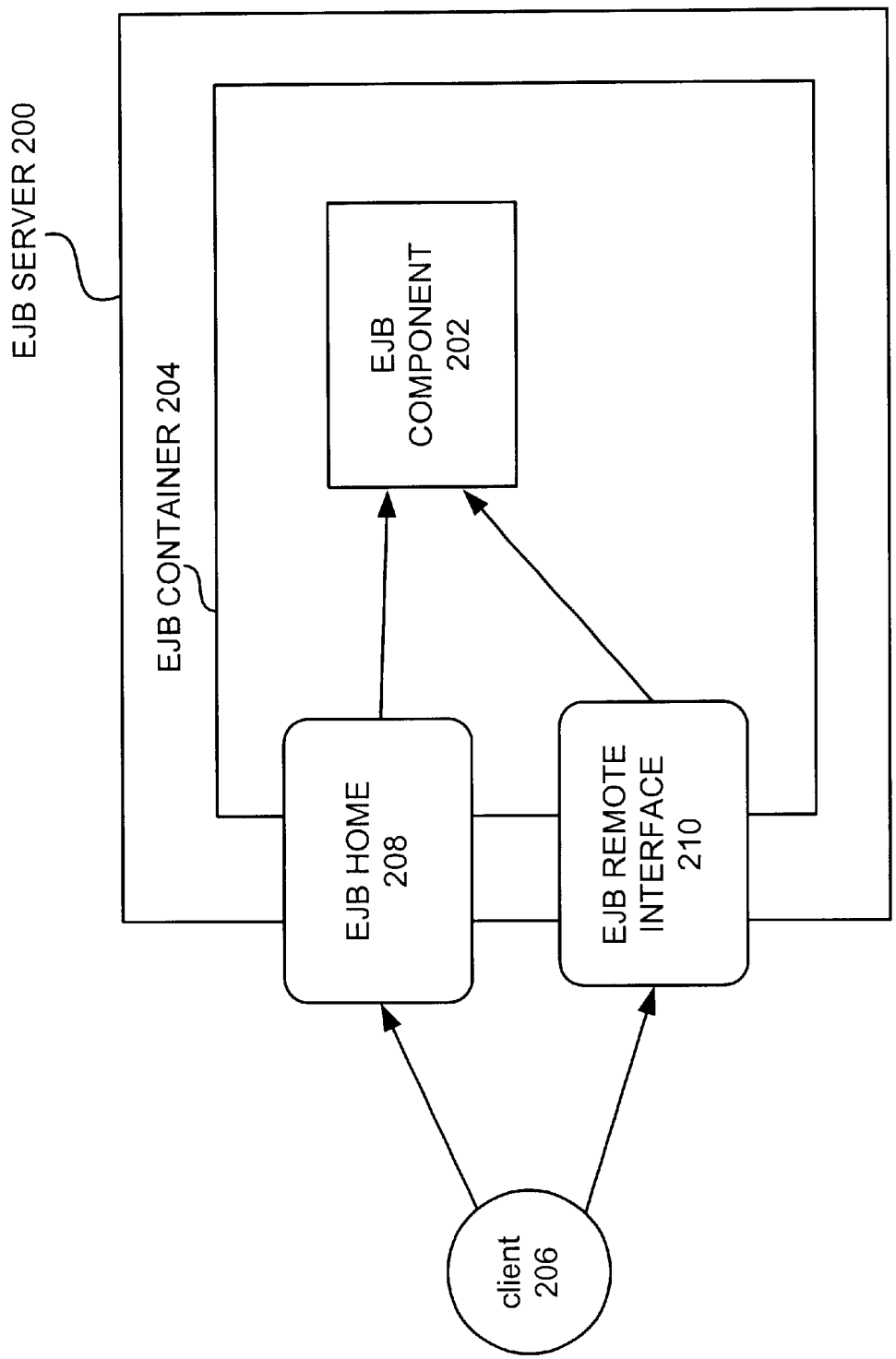
FIG. 2 shows an Enterprise Java Bean (EJB) server in accordance with an embodiment of the invention.

One of the basic building blocks of an EJB based enterprise computer system is what is referred to as an Enterprise Java Bean (EJB) server. FIG. 2 illustrates the architecture of an EJB server 200 in accordance with an embodiment of the invention. Since the EJB specification does not mandate any remote object "wire" protocol, the EJB server 200 can support multiple protocols like RMI, IIOP (CORBA), and DCOM indicating that a client to the EJB server 200 does not have to be written in the Java language. In the described embodiment, the EJB server 200 is a collection of services for supporting an EJB installation. These services include management of distributed transactions, management of distributed objects and distributed invocations on these objects, and low-level system services. In short, the EJB server 200 manages the resources needed to support an EJB component (or Bean) 202 that is included in an EJB container 204. In the described embodiment, the EJB container 204 is a home for EJB components such as EJB component 202 providing a scalable, secure, transactional environment in which EJB components can operate. The EJB container 204 handles the object life cycle, including creating and destroying an object as well as handling the state management of EJB components.

Since the EJB container 204 is transparent to a client 206, there is no client API to it. When an EJB component is installed in the EJB container 204, the EJB container 204 provides two implementations: an implementation of the EJB component's EJB Home interface 208, discussed below, and the EJB component's remote interface.

When a Bean is installed on the EJB server 200, a remote interface referred to as an EJB Object 210 is automatically generated. The EJB Object 210 is an object that exposes only the remote interface specified by the programmer. In this way, the EJB Object 210 acts like a proxy, intercepting any remote object invocations and calling the appropriate methods on the enterprise Bean instance. The EJB container 204 implements the EJB Home interface 208 of each Bean 202 installed in the container. It allows for the creation of a Bean, deletion of a Bean and querying information or "metadata" about a Bean.

Figure 3:
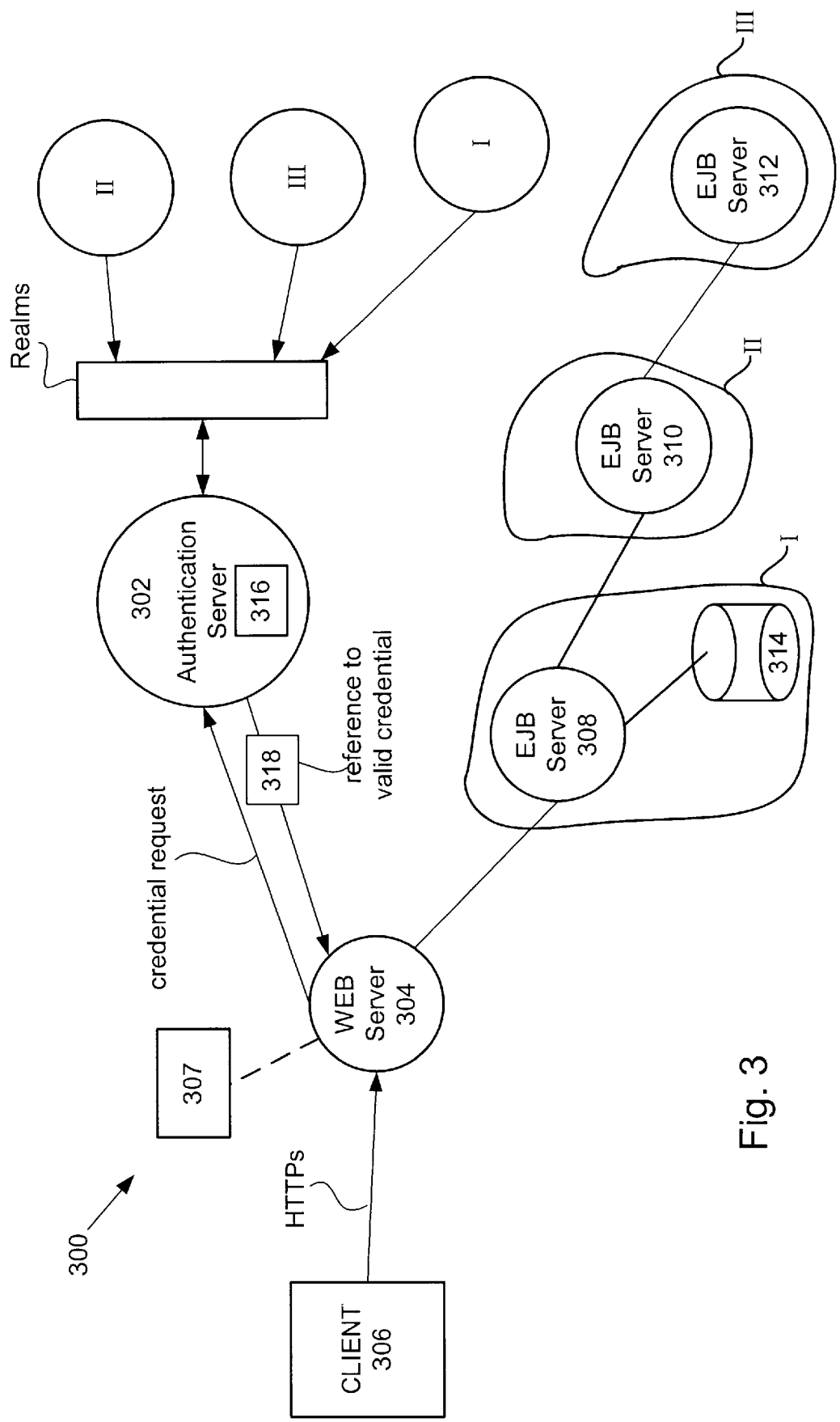
FIG. 3 illustrates an exemplary multi-platform enterprise computer system in accordance with an embodiment of the invention.

FIG. 3 illustrates an exemplary EJB based enterprise computer system 300 in accordance with an embodiment of the invention. The enterprise computer system 300 includes an authentication server 302 securely coupled to a WEB server 304. In the described embodiment, the WEB server 304 is a Java based WEB server used for this example only and should not be construed as limiting the scope of the invention. The WEB server 304 is, in turn, coupled to a client 306, which is typically a WEB browser that can have embedded applications, such as applets, used to generate secure http requests (HTTPs). It should be noted, that in order to assure that no issued credential is stolen or otherwise wrongfully used, all connections within the enterprise computer system 300 must be substantially secure, using, for example, various encryption methods well known to those skilled in the art. In some implementations, a name server 307 is used to identify the location (e.g., the address) of the authentication server 302.

The WEB server 304 is also securely coupled to any number and type of EJB servers 308–312. It should be noted that in the described embodiment, each of the EJB servers 308–312 run on top platforms I, II, and III, respectively, and therefore are implemented as the EJB server 200 shown in FIG. 2. For this example, a secure, or protected, external data base 314 that runs on top of the platform I is securely connected to the EJB server 308. The secure data base 314 is typified by data bases that contain secure information, related to, for example, bank accounts, personal identification, and any other type or class of information considered to be privileged and therefore protected. In some cases, accessing the secure data base 314 requires specific privileges not available to all who otherwise have access to the data base 314. One such example, is the case where the data base 314 includes, for example, payroll information that only specific individuals in an organization are granted the privilege to access. In this case then, in addition to a general access, a more specific privilege is required in order to perform certain tasks, such as giving someone a raise.

In order for the authentication server 302 to provide a credential that affords appropriate access to a requesting client (which in this case is the WEB browser 304), the requesting client must first provide information to the authentication server 302 related to, for example, specifying which realm to authenticate the client 306 in, specifying the authentication method (i.e., BASIC, FORM_BASED), and specifying the authentication type (i.e., U/P, SSL_CLIENT).

It should be noted that when the authentication server 302 has determined which realms (and what additional privileges, if any) that requesting client 306 is authenticated in, a credential object 316, also referred to as a credential, is instantiated. A reference 318 to that credential is then passed to the client 306 by way of the WEB server 304. Since only a reference to the credential is passed to the requesting client, any number of other clients, such as threads, for example, coupled to the authentication server 302 can also reference the same credential.

Once the requesting client (i.e., the client 306) has received the reference to the credential, access to any number of secure resources can be gained by passing a specific access request along with the reference to the particular resource to be accessed. It should be noted, however, that the credential is only valid for those realms for which it was originally been authenticated. Therefore, any secure resource located in a realm for which authentication has not been granted will deny the client 306 access until a new credential is issued authenticating access to that particular realm, or the current credential is updated with the authenticated attributes from that realm.

For example, if a user implementing the client 306 desires to access the data base 314 in order to, for example, run a payroll program, a secure http request (HTTPs) must be generated requesting a credential for access to the data base 314. If additional privileges beyond mere access are required in order to complete the transaction, then this fact must be included in the information provided by the user. In some cases, the authentication server 302 will respond back to the WEB server 304 that additional information is required, in which case, a question and answer session will be initiated until such time as the authentication server 302 has determined that it has enough information to either grant or deny a credential to the requesting client for the requested realm(s).

Once the authentication server has enough information to process the credential request, it validates those realms for which the credential will grant access to any client possessing a reference to that credential. It is important to note that since the reference to the credential is analogous to a "bearer bond", only legitimate clients should possess the reference. Therefore, using secure lines between the various elements of the enterprise computer system 300 is an important consideration during design and implementation. The authentication server 302 grants or denies a credential based upon the supplied information, and in that case when a credential is denied, an error flag is posted to the requesting client 306. On the other hand, when the authentication server 302 determines that a credential should be granted, then a credential object is instantiated and, in one implementation, stored in the authentication server 302 and a reference to that credential object is passed to the requesting client 306.

Once the requesting client 306 has the reference to the credential, it forwards a request to access the data base 314 to the EJB server 308. In one embodiment, the data base access request is accompanied by the reference to the credential such that the EJB server 308 can ascertain that the requesting entity (i.e., the client 306) has the proper authentication to transact business with the data base 314. In some cases, the EJB server 308 will be required to access another of the EJB servers, such as EJB server 310, in order to complete the requested transaction. In this case as well, the request by the EJB server 308 to the EJB server 310 also is accompanied by the reference to the credential. If the credential is valid for the resources coupled to the EJB server 310, then access is granted and the transaction is completed, other wise access is denied. Therefore, it is for at least this reason that when the request is made to the authentication server 302 that it requests privilege for each realm for which access will be required.

Figure 4:
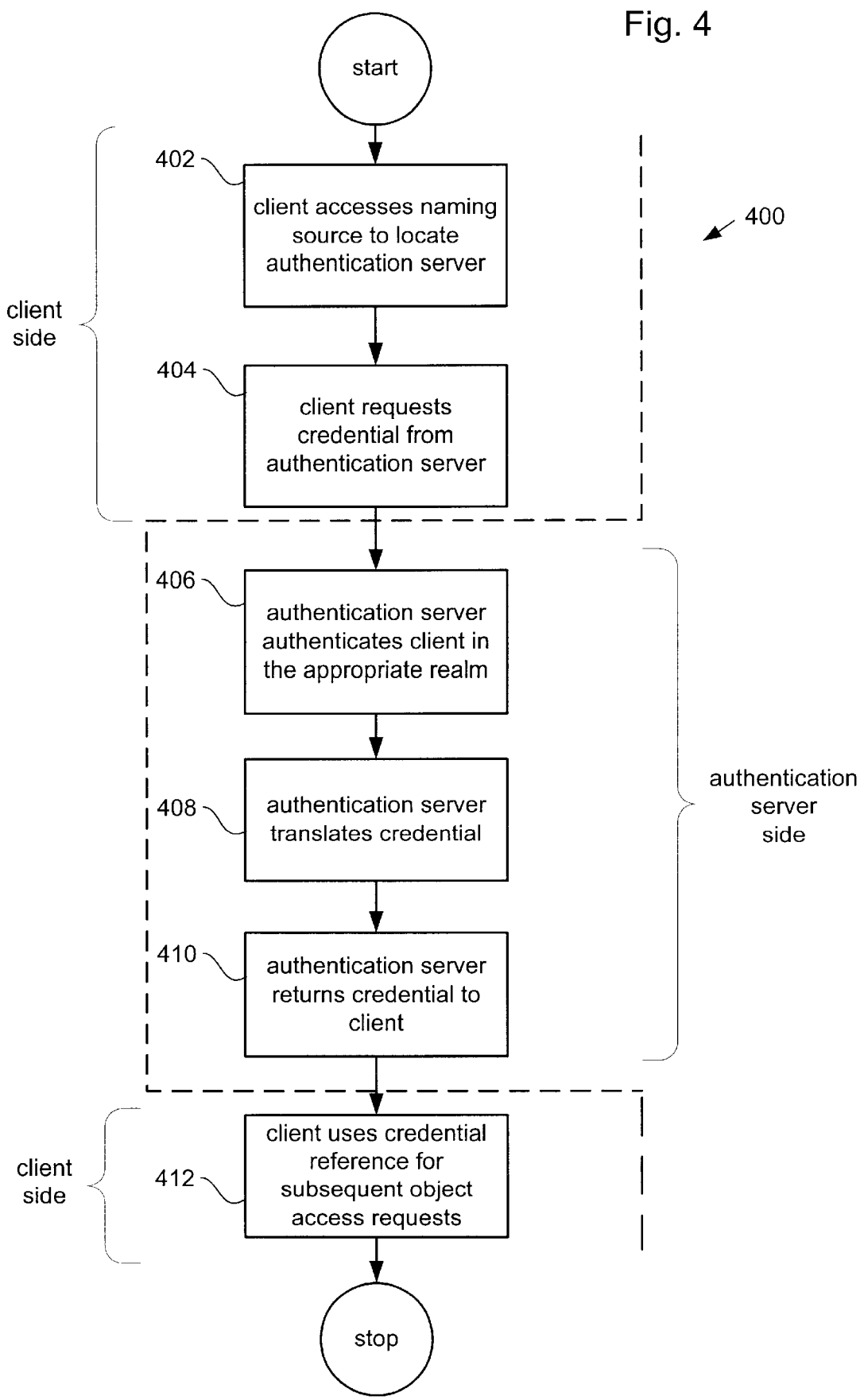
FIG. 4 is a flowchart detailing a process for a client for obtaining a credential in order to access an object in accordance with an embodiment of the invention.

FIG. 4 is a flowchart detailing a process 400 for a client for obtaining a credential in order to access an object in accordance with an embodiment of the invention. It should be noted that the process 400 can be sub-divided into two sub-regimes, specifically those actions carried out by the requesting client (referred to as client side) and those actions carried out by the authentication server (referred to as authentication server side). In order for a client to conduct a transaction, it must at some time obtain access to an object or some other protected resource. In the described embodiment, the client must therefore acquire ownership of a credential that enables the client, as a credential owner, to access particular objects or other protected resources in the enterprise computer system. In the case where the various resources execute on different operating platforms, then the requesting client must identify these platforms so as to be authenticated in order to complete the transaction.

The process 400 for obtaining and using a credential starts, in one implementation, at 402 by the requesting client accessing a name server arranged to provide the location, or address, of an authentication server. In some embodiments, the name server is not required since it only provides the address of the authentication server that can be provided by other methods well known to those skilled in the art. After the location of the authentication server is made known to the requesting client, the requesting client provides a credential request to the authentication server at 404 passing its address and various data pertinent to the authentication. Such pertinent information can include the realm(s) for which authentication is necessary to complete the anticipated transaction, as well as any special privileges required to complete some or all of the anticipated transaction. Once the authentication server has received the request from the requesting client, the authentication server authenticates the client in the appropriate realm(s) at 406 by instantiating a credential object. The authentication server then calls a translation method on the credential object at 408 and returns a reference to the credential object to the requesting client at 410. In the described embodiment, the credential object is stored in the authentication server and only a reference to the credential object is passed. In this way, multiple threads can access the same credential object thereby improving performance and efficiency of the enterprise computer system.

Once the requesting client has obtained the reference to the credential object, the requesting client is capable of providing an object access request in conjunction with the reference to the credential object to a protected resource at 412.

Figure 5A:
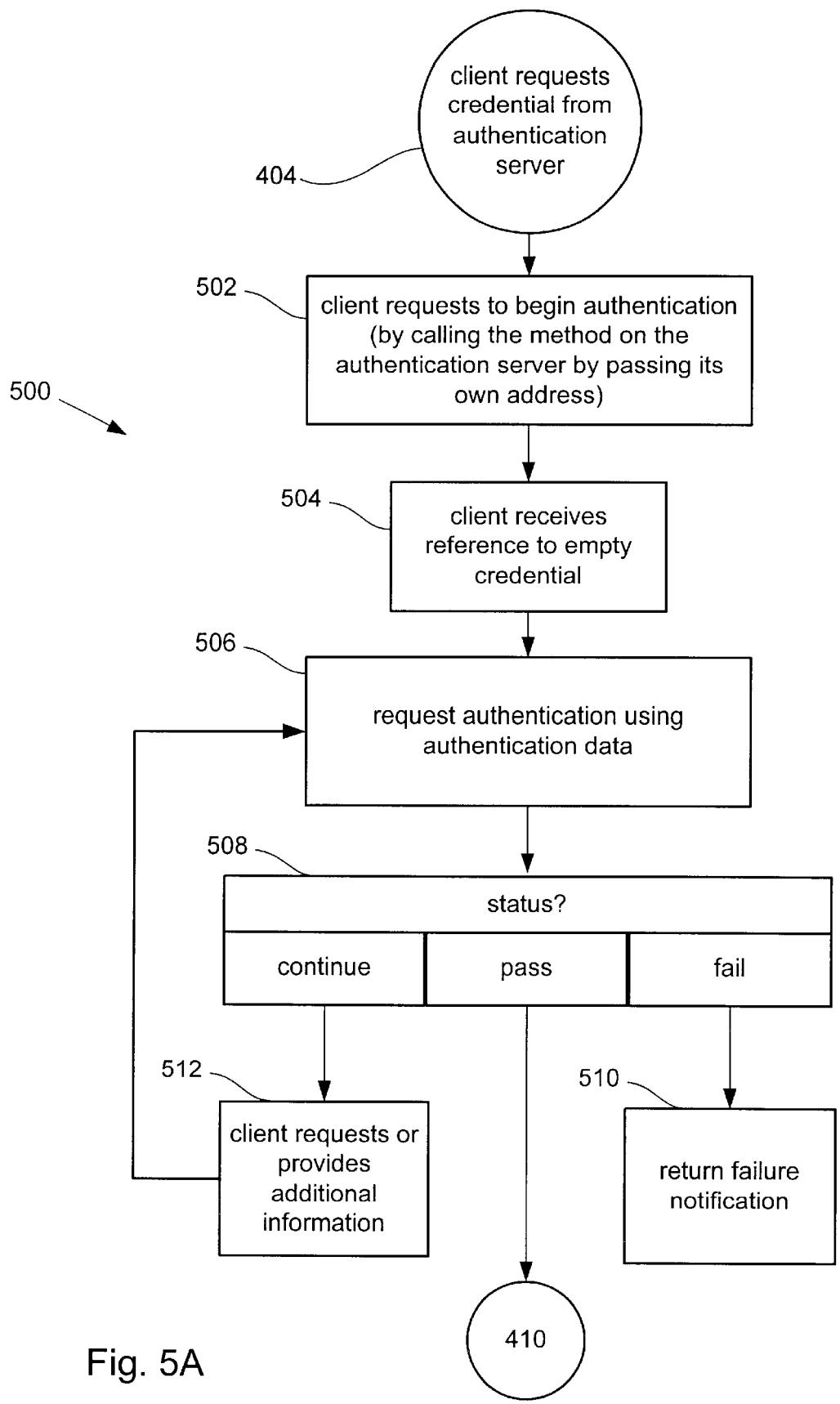
FIG. 5A is a flowchart detailing the process for a client requesting a credential from an authentication server shown in FIG. 4 as operation 404.

FIG. 5A is a flowchart detailing the process 500 for a client requesting a credential form an authentication server shown in FIG. 4 as operation 404. It should be noted that the process 500 is only one possible implementation of the operation 404 and as such should not be construed as limiting the scope or intent of the invention. The process 500 begins at 502 when the client requests to begin authentication by calling the method on the authentication server by passing its own address. In response, the requesting client receives an empty credential at 504 used as a placeholder. Next, at 506, an authentication request is initiated using authentication data provided by the requesting client to the authentication server. Based upon the authentication data, the authentication server initially returns a status flag at 508. In one state, the status flag indicates a fail status meaning that the requesting client has been denied authentication based in part on the authentication data provided. Such a denial can be based upon indicating a realm for which the requesting client is denied access, or special privileges within an approved realm are denied. In any case, the failure flag is returned to the requesting client at 510.

In the case where the status flag is a pass flag, then the authentication server passes a reference to a credential to the requesting client at 410. In some cases, however, additional information is required of the requesting client and in those cases a continue flag is returned such that either the client requests more information or provides additional information at 512, after which control is passed back to 506.

Figure 5B:
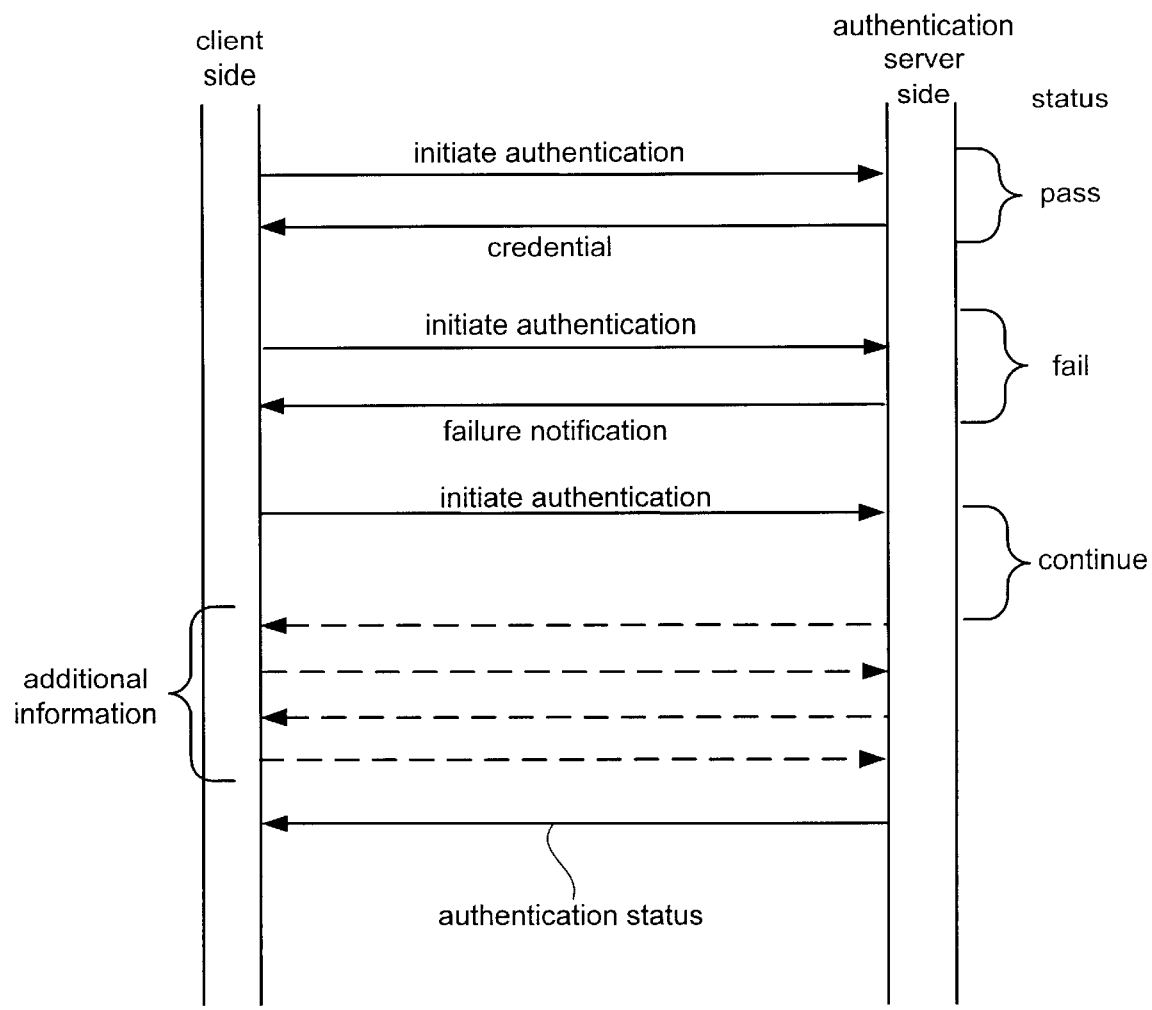
FIG. 5B is a transaction diagram detailing the request/response between the requesting client and the authentication server in accordance with an embodiment of the invention.

In the case where a continue flag is returned, FIG. 5B is a transaction diagram detailing the request/response between the requesting client and the authentication server in accordance with an embodiment of the invention. It should be noted that in the case of a conditional status flag being returned, there can be any number of interim information exchanges until such time as the authentication server is satisfied it has enough information to either grant or deny a credential.

Figure 6:
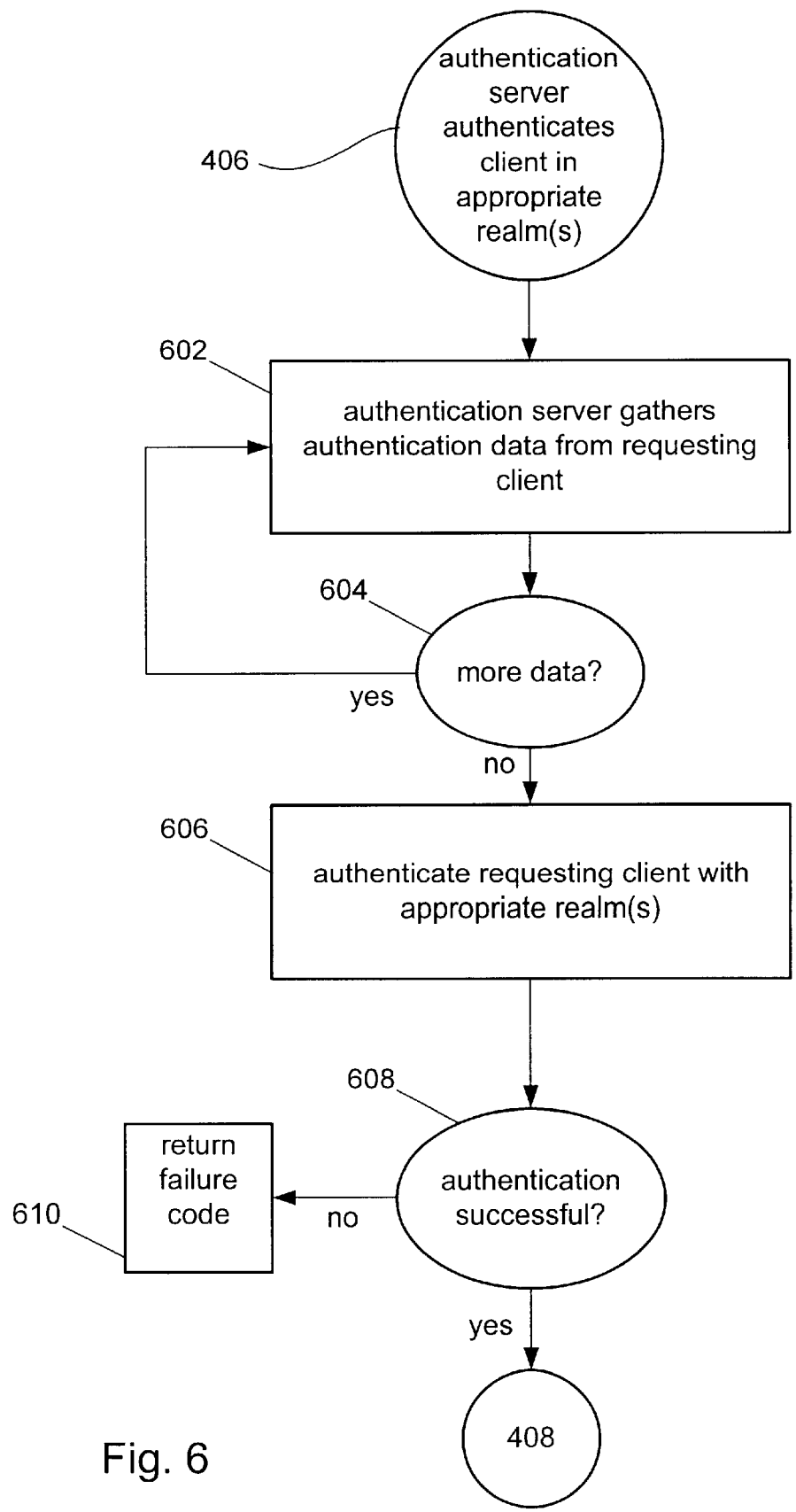
FIG. 6 is a flowchart detailing a process for an authentication server authenticating a client in appropriate realms shown in FIG. 4 as operation 406.

Turning now to FIG. 6 which is a flowchart detailing a process 600 for an authentication server authenticating a client in appropriate realms shown in FIG. 4 as operation 406. It should be noted that the process 600 is only one possible implementation of the operation 406 and as such should not be construed as limiting the scope or intent of the invention. The process 600 begins at 602 by the authentication server gathering authentication data from the requesting client as shown for example in FIG. 5B. A determination is made at 604 whether or not additional data is required and when additional data is not required then the authentication server authenticates the requesting client at 606, otherwise, more data is gathered by the authentication server. If the authentication was deemed to be a success at 608, then control is passed to operation 408 of FIG. 4 where the authentication server translates the credential. If, however, the authentication was deemed to be a failure, then a fail flag is returned at 610.

Figure 7:
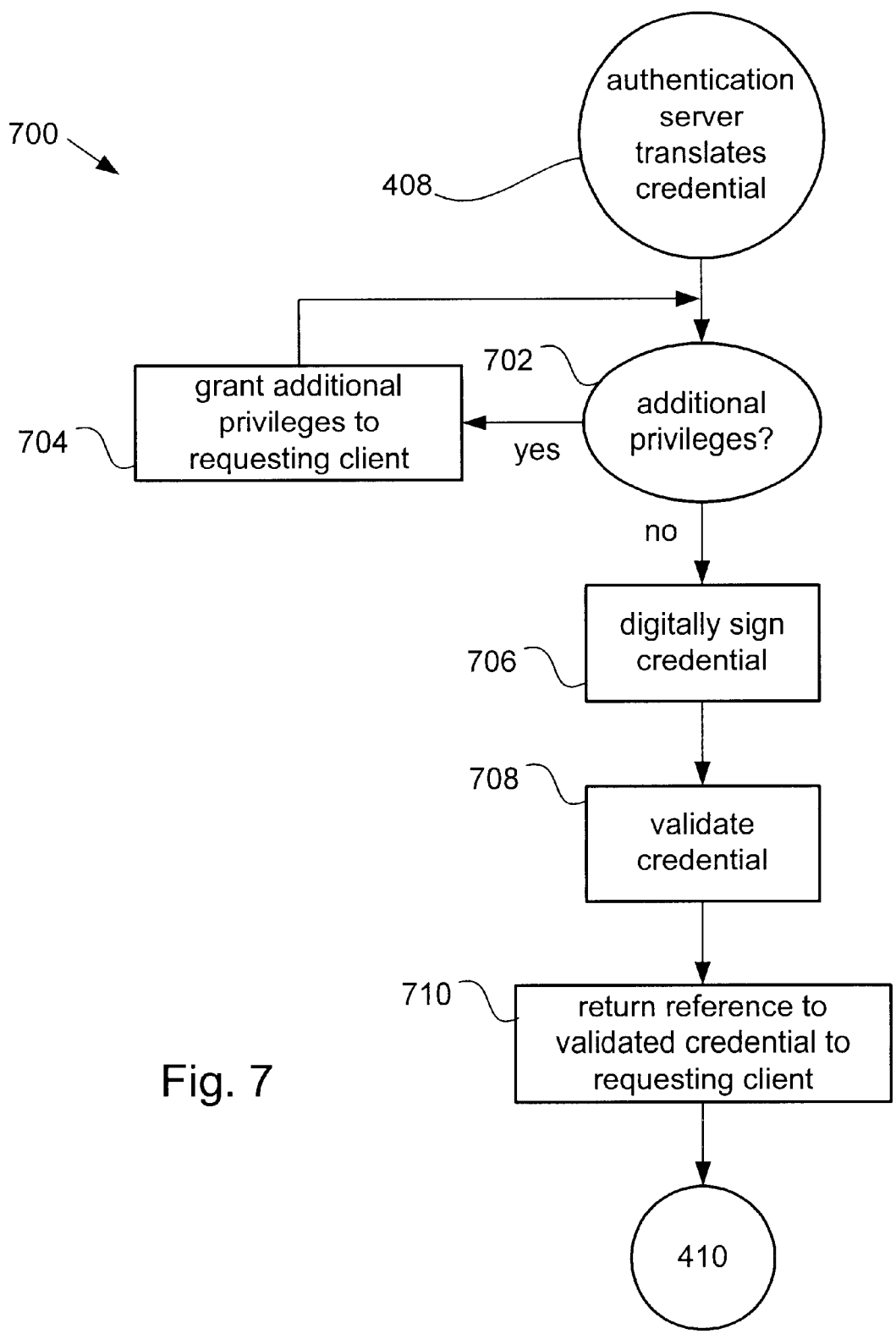
FIG. 7 is a flowchart detailing a process 700 for translating the credential by the authentication server as shown in FIG. 4 as operation 408.

FIG. 7 is a flowchart detailing a process 700 for translating the credential by the authentication server as shown in FIG. 4 as operation 408. It should be noted that the process 700 is only one possible implementation of the operation 408 and as such should not be construed as limiting the scope or intent of the invention. The process 700 starts at 702 by the authentication server determining if additional privileges have been either requested, or are deemed to be appropriate. If additional privileges are appropriate, then those additional privileges are granted by the authentication server to the requesting client at 704. If, however, no additional privileges are required, then the credential is, in one embodiment, digitally signed in order to prevent unauthorized use of the credential at 706 The credential is then validated at 708 by, for example, setting an expiration period after which the credential is subject to being destroyed or other wise being garbage collected. At 710, a reference to the validated credential is then returned to the requesting client at 410.

Figure 8:
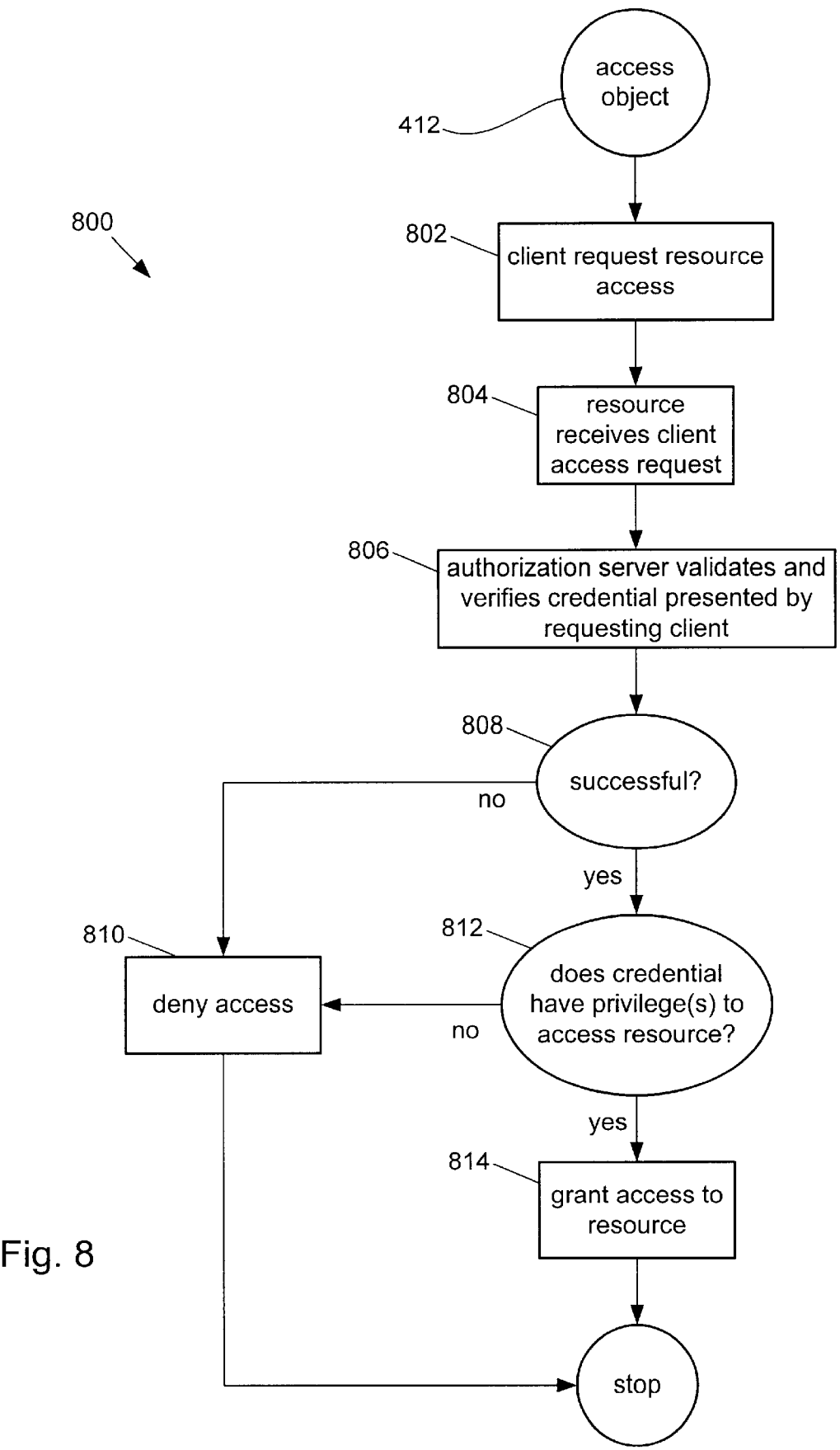
FIG. 8 is a flowchart detailing a process for accessing an object or other protected resource as shown in FIG. 4 as operation 412.

FIG. 8 is a flowchart detailing a process 800 for accessing an object or other protected resource as shown in FIG. 4 as operation 412. It should be noted that the process 800 is only one possible implementation of the operation 412 and as such should not be construed as limiting the scope or intent of the invention. The process 800 begins at 802 by the requesting client initiating a protected resource access request. After the protected resource receives the resource access request at 804, the authentication server validates and verifies the associated credential that was presented to the protected resource along with the access request at 806. If the validation and verification are deemed have been unsuccessful at 808 then access is denied at 810, otherwise, then a determination is made at 812 whether or not the credential has the appropriate privileges granted. If the appropriate privileges are not granted, the access is denied at 810, otherwise the requesting client is granted access to the protected resource at 814.

Figure 9:
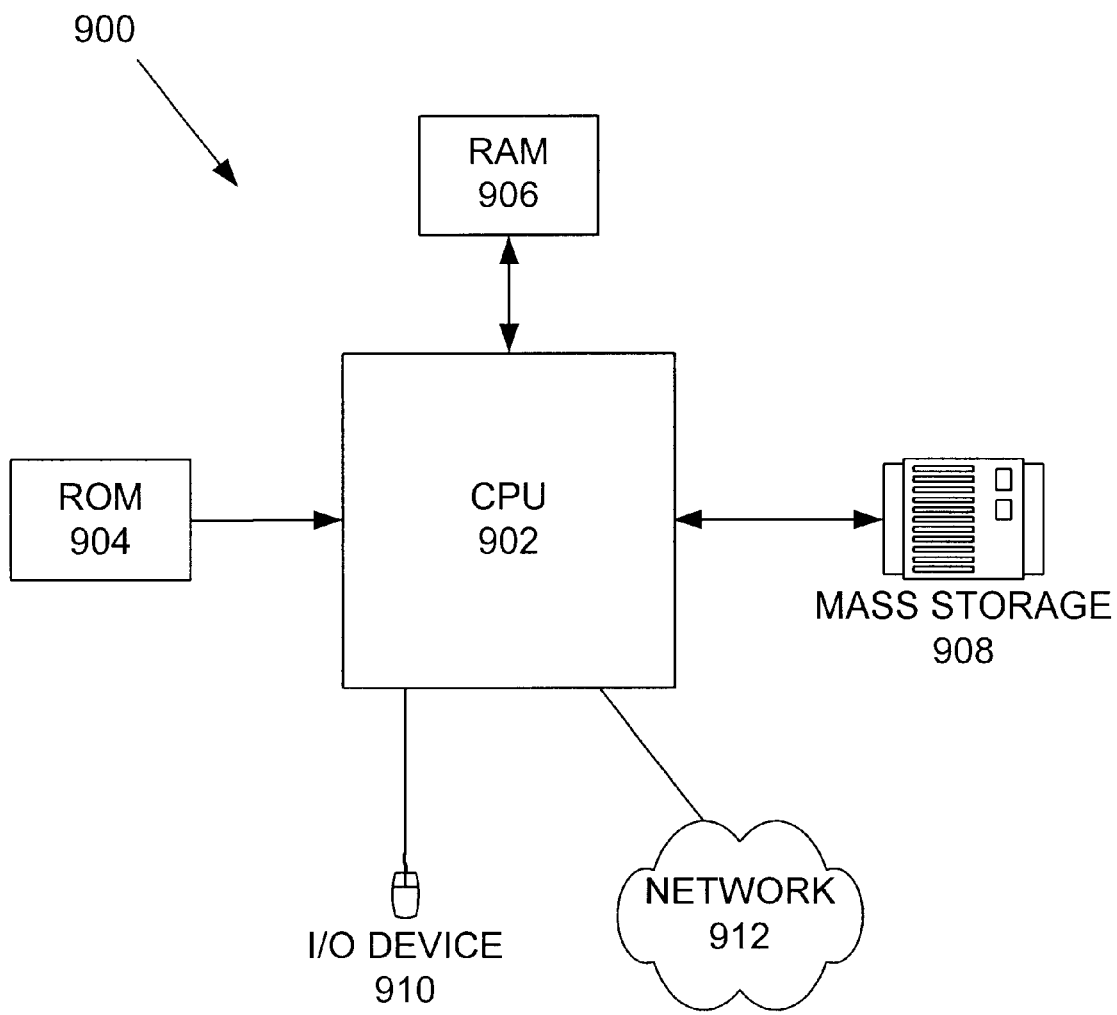
FIG. 9 illustrates a computer system that can be employed to implement the present invention.

FIG. 9 illustrates a computer system 900 that can be employed to implement the present invention. The computer system 900 or, more specifically, CPUs 902, may be arranged to support a virtual machine, as will be appreciated by those skilled in the art. As is well known in the art, ROM acts to transfer data and instructions uni-directionally to the CPUs 902, while RAM is used typically to transfer data and instructions in a bi-directional manner. CPUs 902 may generally include any number of processors. Both primary storage devices 904, 906 may include any suitable computer-readable media. A secondary storage medium 908, which is typically a mass memory device, is also coupled bi-directionally to CPUs 902 and provides additional data storage capacity. The mass memory device 908 is a computer-readable medium that may be used to store programs including computer code, data, and the like. Typically, mass memory device 908 is a storage medium such as a hard disk or a tape which generally slower than primary storage devices 904, 906. Mass memory storage device 908 may take the form of a magnetic or paper tape reader or some other well-known device. It will be appreciated that the information retained within the mass memory device 908, may, in appropriate cases, be incorporated in standard fashion as part of RAM 906 as virtual memory. A specific primary storage device 904 such as a CD-ROM may also pass data uni-directionally to the CPUs 902.

CPUs 902 are also coupled to one or more input/output devices 910 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 902 optionally may be coupled to a computer or telecommunications network, e.g., an Internet network, or an intranet network, using a network connection as shown generally at 912. With such a network connection, it is contemplated that the CPUs 902 might receive information from the network, or might output information to the network in the course of performing the above-described method steps. Such information, which is often represented as a sequence of instructions to be executed using CPUs 902, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention.

Although the methods of providing cross platform security protocols in accordance with the present invention are particularly suitable for implementation with respect to a Java™ based environment, the methods may generally be applied in any suitable object-based environment. In particular, the methods are suitable for use in platform-independent object-based environments. It should be appreciated that the methods may also be implemented in some distributed object-oriented systems.

While the present invention has been described as being used with a computer system that has an associated web browser, it should be appreciated that the present invention may generally be implemented on any suitable object-oriented computer system. Therefore, the present examples are to be considered as illustrative and not restrictive, and the invention is not to be limited to the details given herein, but may be modified within the scope of the appended claims along with their full scope of equivalents.

What is claimed is:

1. In a distributed computing system, an authentication server arranged to provide a credential reference used by any of a number authenticated requesting clients to access a protected resource in a requested realm, comprising:

a credential request verifier arranged to determine if additional authentication data is required by the authentication server in order to grant the credential reference to the requesting client;

a realm authenticator coupled to the credential request verifier arranged to authenticate the requesting client in a requested realm when it is determined that the requesting client is allowed to access the requested realm;

a credential translator coupled to the realm authenticator arranged to grant a requested privilege in the authenticated realm to the requesting client when it is determined that the requesting client is allowed the requested privilege in the authenticated realm;

a credential generator coupled to the credential translator arranged to generate a credential in the authentication server; and a credential reference generator that provides the credential reference to the requesting client wherein the credential reference points back to the credential that allows the requesting client access to the protected resource.

2. An authentication server as recited in claim 1, wherein when the credential request verifier determines that additional authentication data is required, then the credential request verifier initiates a session between the requesting client and the credential request verifier arranged to provide the additional authentication data.

3. An authentication server as recited in claim 2, wherein when it is determined that the requesting client is not allowed access to the requested realm, then a first type fail flag is posted to the requesting client.

4. An authentication server as recited in claim 3, wherein when it is determined that the requesting client is not allowed the requested privilege in the authenticated realm, then a second type fail flag is posted to the requesting client.

5. An authentication server as recited in claim 4, wherein the credential generator instantiates a credential object that resides in the authentication server.

6. An authentication server as recited in claim 5, wherein the credential generator returns a remote reference to the credential object to the requesting client which is then used to access the protected resource such that the requesting client is the credential owner.

7. An authentication server as recited in claim 6, wherein the authentication server is securely coupled to the requesting client.

8. An authentication server as recited in claim 7, wherein the authentication server and the requesting client are each securely coupled to the protected resource by way of an Enterprise Java Bean (EJB) server, wherein the authentication server, the requesting client, and the EJB server together form an EJB enterprise computer system.

9. An authentication server as recited in claim 8, wherein when the requesting client requires access to the protected resource, the requesting client presents a protected access request in addition to the reference to the credential to the EJB server.

10. An authentication server as recited in claim 9, wherein the EJB server responds to the presenting of the reference to the credential by requesting the authentication server validate the presented credential, wherein when the credential is validated, the EJB server grants the requesting client access to the protected resource, otherwise, the requesting client is denied access to the protected resource.

11. An authentication server as recited in claim 10, wherein the requesting client is a web browser.

12. An authentication server as recited in claim 1, wherein the authentication server has an address location provided by a naming service.

13. An authentication server as recited in claim 1, wherein the credential reference is provided to a second requesting client that is different from the requesting client when the second requesting client is authenticated to access to the protected resource.

14. A method of accessing a protected resource in a multi-platform enterprise computer system having an authentication server arranged to provide a credential reference associated with a credential used by any of a number of requesting clients to access the protected resource, wherein the authentication server is securely coupled to the requesting client and a server coupled to the protected resource, comprising:

providing an access request to the authentication server by the requesting client that includes authentication data indicative of the protected resource;

authenticating the requesting client to access the protected resource by the authentication server based upon the authentication data;

authenticating the requesting client to exercise a privilege associated with the protected resource, wherein the privilege is in addition to the granted access;

providing the requesting client with the credential reference;

presenting the credential reference along with a protected resource access request to the server;

validating the credential by the authentication server when the credential reference is presented by the server; and granting the requesting client access to the protected resource by the server when the credential is validated.

15. A method as recited in claim 14, wherein the server is an Enterprise Java Bean (EJB) server.

16. A method as recited in claim 14, wherein the protected resource is a data base.

17. A method as recited in claim 16, wherein the requesting client is a web browser.

18. A method as recited in claim 17, wherein when the authentication server denies the access request of the requesting client, then the authentication server responds by posting a first type fail flag.

19. A method as recited in claim 17, wherein when the authentication server denies the requesting client the requested privilege, the authentication server posts a second type fail flag, whereas the authentication server provides the requesting client with the credential to access the protected resource without the privilege.

20. A method of accessing a protected resource in a multi-platform enterprise computer system having an authentication server arranged to authenticate a credential used by a requesting client as a credential owner to access the protected resource, wherein the authentication server is securely coupled to the requesting client and an EJB server coupled to the protected resource, comprising:

providing a credential request to the authentication server by the requesting client, wherein the credential request includes authentication data indicative of the protected resource;

authenticating the requesting client to access the protected resource by the authentication server base upon the authentication data;

authenticating the requesting client to exercise a privilege associated with the protected resource, wherein the privilege is in addition to the granted access;

providing the requesting client with a reference to the credential;

presenting the reference to the credential along with a protected resource access request to the server;

validating the credential by the authentication server when presented by the server; and granting the requesting client access to the protected resource by the EJB server when the credential is validated.

21. A method as recited in claim 20, wherein the protected resource is a data base.

22. A method as recited in claim 20, wherein the requesting client is a web browser.

23. A method as recited in claim 22, wherein when the authentication server denies the credential request of the requesting web browser, then the authentication server responds by posting a first type fail flag.

24. A method as recited in claim 22, wherein when the authentication server denies the requesting web browser the requested privilege, the authentication server posts a second type fail flag, whereas the authentication server provides the requesting client with the credential to access the protected resource without the privilege.

* * * * *